Oct. 15, 1957  S. HERSH  2,809,558
GUIDE LOADED SWITCH
Filed May 7, 1953  2 Sheets-Sheet 1

INVENTOR.
SIDNEY HERSH
BY
ATTORNEYS

Oct. 15, 1957

S. HERSH 2,809,558

GUIDE LOADED SWITCH

Filed May 7, 1953

INVENTOR.
SIDNEY HERSH

2,809,558
GUIDE LOADED SWITCH

Sidney Hersh, Silver Spring, Md., assignor to the United States of America as represented by the Secretary of the Navy Application May 7, 1953, Serial No. 353,698

6 Claims. (Cl. 89—1.7)

(Granted under Title 35, U. S. Code (1952), sec. 266)

The invention described herein may be manufactured and used by or for the Government of the United States of America for governmental purposes without the payment of any royalties thereon or therefor.

This invention relates to rocket launchers and more particularly to a rocket launcher wherein a novel releasable clamping mechanism restricts rocket movement in the launcher until an activated rocket automatically conditions release of the clamping mechanism.

Many types of mobile rocket launchers are transported in the loaded condition so that the rockets are ready to be fired instantly. In transit from one location to another these mobile, loaded launcher units are subjected to severe jolts and vibrations which have a tendency to dislodge the rockets within the launcher thereby displacing them from the loaded position. Relative shifting of the rockets in the launcher subjects the electrical firing contacts to wear and abrasion. This firing contact mutilation and the relative displacement of the rockets within the launcher is a substantial contributing factor which accounts for a number of misfires and other malfunctioning.

Therefore an object of this invention is to provide a releasable clamping mechanism which will retain a rocket in the firing position once the rocket is loaded into position.

Another object is to provide a releasable latch mechanism that will restrict rocket displacement on the launcher rail thereby assuring electrical engagement of the firing elements with a minimum of wear and abrasion.

A further object of this invention is to provide a switch interconnected with a releasable rocket latching mechanism which will complete an electrical circuit to a remote indicating panel board thereby designating whether a particular rocket has been dislodged within the launcher from the firing position.

Another object of this invention is to provide a simple, compact device for steadfastly retaining a rocket in the firing position until a preselected rocket force overcomes a retarding resistance to release the rocket for flight.

Still another object of this invention is to provide a rocket launcher with a releasable locking mechanism and switch assembly for retaining a rocket in a desired position whereby upon premature rocket displacement the switch assembly will complete a circuit designating the particular displaced rocket.

The invention also has in contemplation the provision of a rocket actuated releasable clamping means suitable for adaptation on rocket launchers employing the more conventional launching rails or tubes.

Other objects and many of the attendant advantages of this invention will be readily appreciated as the same becomes better understood by reference to the following detailed description when considered in connection with the accompanying drawings wherein.

Figure 1:
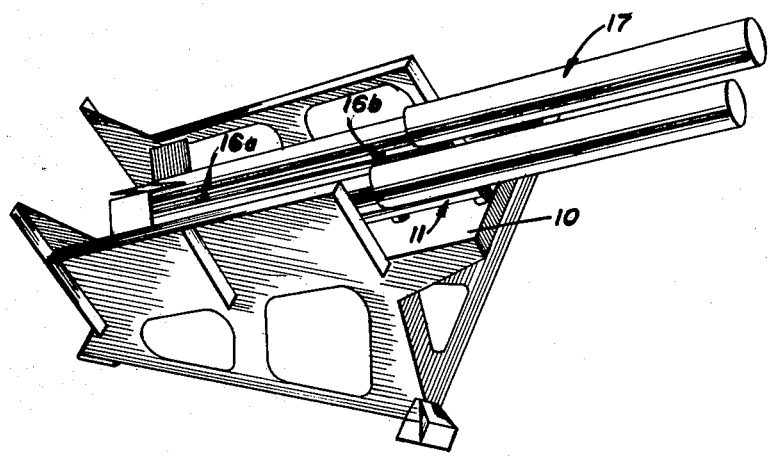
Fig. 1 is a perspective view of a rocket launcher embodying the present invention.

Referring to the drawings, in which like numerals designate the same parts throughout the several views, and more particularly to Fig. 1 wherein there is illustrated a device constructed in accordance with the present invention and comprising a suitable framework on which the rail plate 10 is mounted to support longitudinal rocket guide rails 11 laterally spaced from one another. Securely anchored to the rail plate 10, as with bolts 12, is a switch and lever assembly base plate 13 which serves to support the guide loaded switch 14 and the switch actuating rocket latching lever assembly 15 which cooperatively engages with the aft suspension positioning button 16a fastened to the periphery of the rocket 17, of course a similar button may project from the opposite side of the rocket to provide aerodynamic balance. The switch actuating rocket latching lever assembly 15 as illustrated in Figs. 2 and 3 cooperatively engages the button 16a on the rocket 17 within the confines of the rocket launching rail 11, however, the releasable latch assembly 15 may readily be used with other rocket launchers in conjunction with conventional launcher rails by simple mechanical modifications apparent to those skilled in the art.

Figure 4:
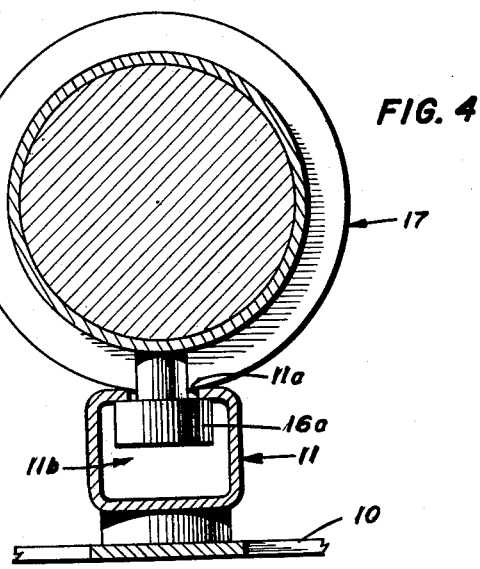
Fig. 4 is a somewhat enlarged cross-sectional view looking forward, taken along a line substantially corresponding to line 4—4 of Fig. 3.

The launching rail 11, designed to support the rocket 17, as shown in Fig. 4, is substantially an open channel that is anchored to the rail plate 10 and is provided with a longitudinal button guide opening 11a to receive supportingly the fore and aft suspension lugs or buttons 16b and 16a, respectively.

The rocket latching lever assembly 15 mounted on the assembly base 13 includes a rocket latching lever 18 pivotable on stub shaft 19 which is secured to the base 13. A notch 20 on the upper end of lever 18 is disposed in the path of the aft suspension button 16a on the rocket 17. An aperture 21 within the rail 11 and base plate 10 provides suitable access for lever 18 so that the notch 20 may engage with button 16a on the rocket 17 within the recess 11b of the launcher rail 11, as illustrated in Figs. 2 and 3. An abutment 23 is mounted on the base 13 and is designed to limit movement of lever 18 in both the forward and rearward directions by buttressing against selected positions on the lever 18, for example, the forward movement of the lever 18 is restricted by the protuberance 24 on lever 18.

Figure 2:
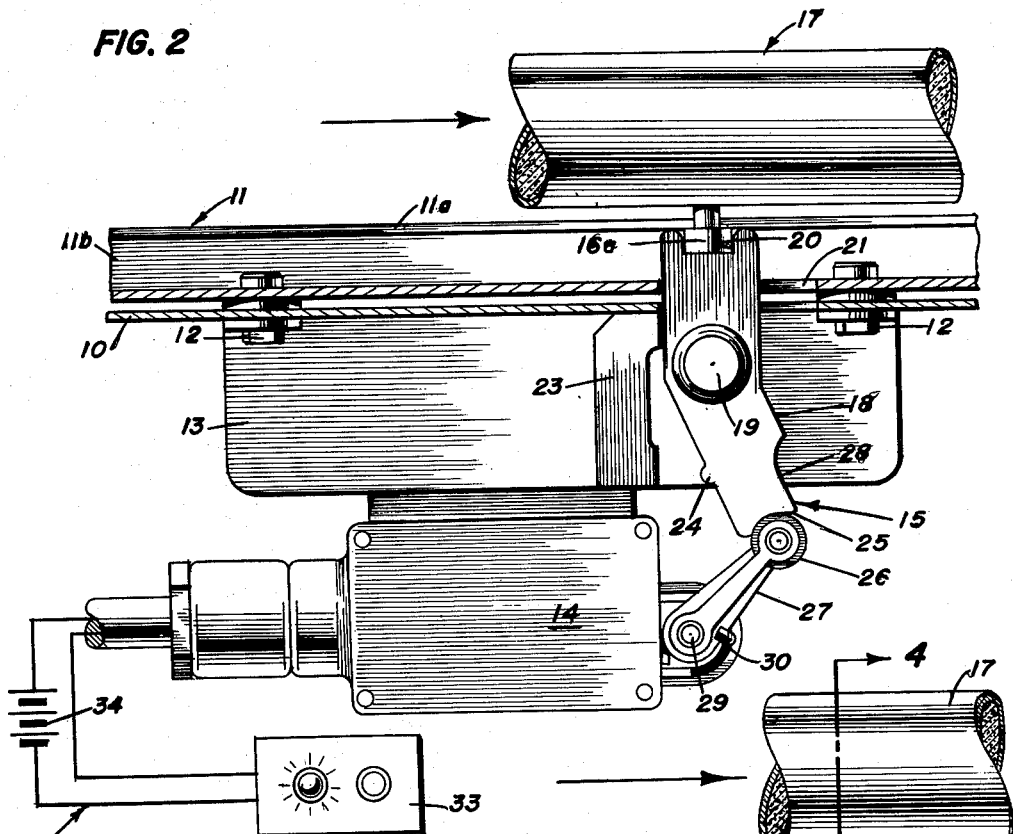
Fig. 2 is an enlarged side view of part of the rocket launcher illustrating the manner in which a rocket is held in position by the releasable locking mechanism and includes a schematic view of an electrical circuit to a remote indicating panel light source.
Figure 3:
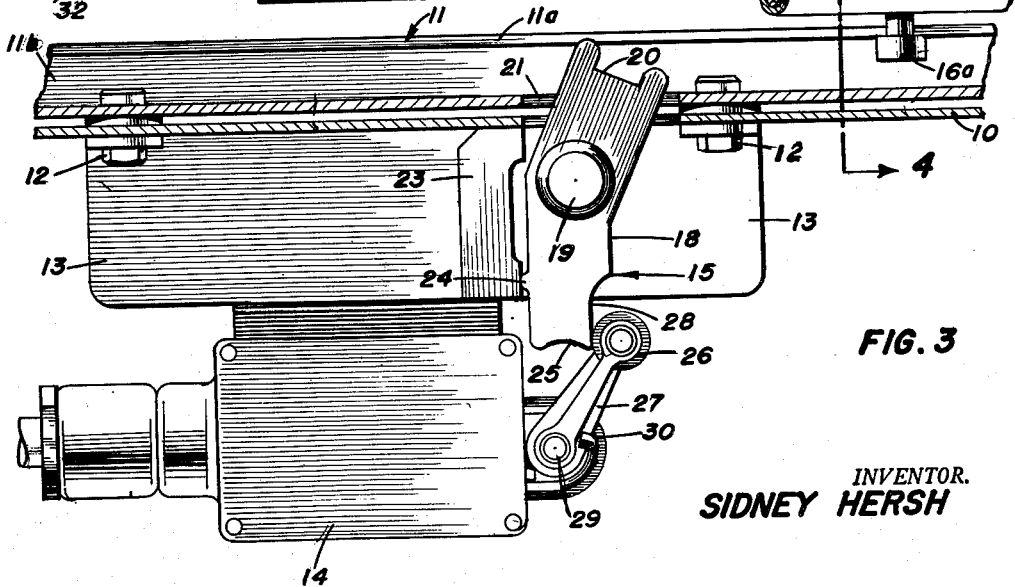
Fig. 3 is a view similar to Fig. 2 showing the locking mechanism in the released position.

On the other end of the lever 18 from the notch 20 is a camming concavity 25, illustrated in the locked position by Fig. 2, wherein the roller 26 supported for rotation on spring loaded arm 27 engages within the concavity 25 to retain securely the button 16a on the rocket within the notch 20. A camming recess 28 adjacent the locking concavity 25 and cooperating with the roller 26 is designed to accelerate movement of the upper notched end of lever 18 in the direction of rocket travel to afford clearance for the button 16a as the rocket is propelled from the launched rail 11.

The spring loaded arm 27 that supports roller 26 pivots about the shaft 29 about which spring 30 is encircled to urge the roller 26 into engagement with camming surfaces 25 and 28 on the lower end of lever 18. The design of the spring 30 encircling the shaft 29 may be of the torsion type as illustrated, however, a flat spring or suitable extension spring may be affixed to points on the arm 27 and the base 13 to provide the requisite resistance for the lever 18 to prevent premature rocket displacement.

In the locked or round loaded position, shown in Fig. 2, the spring 30 exerts sufficient force through arm 27 to retain the roller 26 within the concavity 25. Displacement as well as actual discharge of the rocket 17 from the rail 11 will be retarded until the rocket is fired at which time sufficient force is exerted by the rocket 17 through button 16a to overcome the resistance of the spring 30 on arm 27. It will be apparent that the structure described thus far may operate independently of any additional mechanism thereby providing the requisite confining mechanism to limit rocket movement prior to rocket firing.

Securely supported from the base 13 is a guide loaded switch 14 of the conventional variety, having contacts operated by movement of the arm 27. Of course, any suitable switch may be used that will control an electric light circuit 32 to a remote indicating panel board 33 illustrated schematically in Fig. 2. The electrical circuit 32 energized through an electric energy source and shown as a battery 34 is connected through contacts in switch 14 so that the circuit 32 to the light indicating panel board 33 may be opened or closed depending on the positioning of the rocket, thereby indicating when the rocket is released or displaced from the loaded position on the rail.

The operation of the launcher and release mechanism briefly is as follows: a rocket 17 is loaded in the launcher with the buttons 16a and 16b mounted on the rocket 17 sliding within the confined recess 11b of the rail 11, and as the button 16a on the rocket 17 engages in the notch 20 on lever 18 the lever is restrained from pivoting about stub shaft 19 by the roller 26 on spring biased arm 27 until sufficient force is exerted by the button 16a on the arm 27 through lever 18 to cam the end of arm 27 out of the cam recess 28 and into the concavity 25 on lever arm 18 thereby releasably retaining the rocket 17 in the ready to fire position as shown in Fig. 2. Pivoting the arm 27 rotates the shaft 29 which closes an electrical circuit by the engaging contacts (not shown) within the switch 14 and indicating on a light panel board 33 that the rocket is in position and ready to be fired. Upon firing the rocket sufficient forward thrust must be exerted by the button 16a attached to the rocket 17 which is within the notch 20 of the lever 18 to pivot lever 18 about the shaft 19 thereby removing the roller 26 from concavity 25 to cam surface 28 which movement serves to accelerate button releasing movement of arm 18.

Obviously many modifications and variations of the present invention are possible in the light of the above teachings. It is therefore to be understood that within the scope of the appended claims the invention may be practiced otherwise than as specifically described.

What is claimed is:

1. The combination of a rocket guide rail, a rocket propelled missile, a guide button extending from the missile into the confines of the guide rail, a switch located adjacent the rail, an actuating arm with an end roller pivotally secured to said switch, and a rockable lever having a concavity in one end nearest the actuating arm to retain the roller in the switch closed position on the arm when a missile is in loaded position and a notch in the opposite end of the lever lying in the path of the button for engagement by the button to rock the switch arm into said switch closed position when sliding the missile onto the track, said notch encompassing the button to latch the missile in place on the rail.

2. A launcher for discharging a rocket propelled missile comprising a base, a rocket launching guide rail with an elongated aperture therein mounted on said base, a member projecting from the missile slidably engaged within the rail, a latching lever pivotally mounted for limited movement having a member engaging notch at one extremity aligned to pass through the elongated aperture in said rail and a camming concavity at the other extremity with a camming recess associated therewith, and a spring urged actuating arm with an end roller for engagement with the camming recess and concavity whereby in the loaded position the member engaging notch will limit rocket displacement when the roller engages the lever concavity until sufficient force is exerted by the rocket to overcome the selected resistance offered by the spring urged arm.

3. A launcher for discharging a rocket comprising; a base, a rocket launching guide rail with an elongated aperture therein mounted on said base, a member projecting from the rocket slidably engaged within the rail, a latching lever pivotally mounted for limited movement and having a member engaging notch at one extremity aligned to pass through the elongated aperture in said rail for latching engagement with a member projecting from a rocket to be fired, said latching lever further defining a camming concavity at the other extremity thereof with an interconnecting camming recess, an electrical switch actuatable in accordance with the loading on the rail, said switch including a spring urged actuating arm with a roller at one end for engagement with the camming recess and concavity on said latching lever, and a switch actuating means at the other end whereby in the loaded position the notch on the latching lever will engage the member on the rocket to limit rocket displacement and the arm will condition the switch actuating means to complete an electrical circuit to a remote indicating station.

4. A launcher for discharging a rocket comprising a base, a launching guide rail secured to the base, releasable locking means pivotally mounted on said base and having a notched portion in one end thereof in locking engagement with the rocket and a camming concavity in the other end thereof, and a pivotally mounted yieldable member having a roller in engagement with said camming concavity for maintaining said notched portion in locking engagement with the rocket until a preselected force is exerted on said locking means by an activated rocket.

5. The combination of a rocket launcher rail, a rocket, and a switch actuatable in accordance with the loaded condition of the launcher rail, a rail engaging projection on the rocket, cammed locking means pivotally mounted on said rail and having a notched portion engaging the projection to limit untimely rocket displacement, and yieldable pivot means in engagement with said locking means to actuate the switch when conditioned by the cammed locking means whereby a preselected force exerted on the locking means by an activated rocket pivots the yieldable means and causes the notched portion to be disengaged from said projection so that the rocket may be released from the launcher.

6. The combination of a rocket launcher rail, a rocket having a rail engaging projection and a releasable locking mechanism for restraining untimely rocket displacement said locking mechanism comprising; a rockable lever having at one end a camming concavity and a cooperating camming recess and a projection engaging member at the other end, a yieldable actuating arm with an end roller which follows within said recess and concavity to lock releasably the rocket projection within the projection engaging member through the rail as the roller is cammed into the concavity.

References Cited in the file of this patent
UNITED STATES PATENTS

| | | |
|---|---|---|
| 2,414,579 | Anderson | Jan. 21, 1947 |
| 2,460,929 | Goff | Feb. 8, 1949 |
| 2,496,316 | Skinner et al. | Feb. 7, 1950 |
| 2,659,274 | Lauritsen | Nov. 17, 1953 |

FOREIGN PATENTS

| | | |
|---|---|---|
| 912,398 | France | Apr. 29, 1946 |
| 914,341 | France | June 17, 1946 |